US011935695B2

(12) United States Patent
King et al.

(10) Patent No.: US 11,935,695 B2
(45) Date of Patent: Mar. 19, 2024

(54) SHOCK PROTECTION IMPLEMENTED IN A BALANCED ARMATURE RECEIVER

(71) Applicant: Knowles Electronics, LLC, Itasca, IL (US)

(72) Inventors: Charles King, Oak Park, IL (US); Christopher Monti, Elgin, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 17/560,899

(22) Filed: Dec. 23, 2021

(65) Prior Publication Data

US 2023/0207173 A1 Jun. 29, 2023

(51) Int. Cl.
*H01F 7/08* (2006.01)
*H01F 7/126* (2006.01)

(52) U.S. Cl.
CPC ............. *H01F 7/081* (2013.01); *H01F 7/126* (2013.01); *H01F 2007/086* (2013.01)

(58) Field of Classification Search
CPC ..... H01F 7/081; H01F 7/126; H01F 2007/086
See application file for complete search history.

(56) References Cited

U.S. PATENT DOCUMENTS 3,588,383 A * 6/1971 Carlson et al. ........ H04R 11/00 381/386
4,272,654 A * 6/1981 Carlson .................. H04R 11/00 381/418
5,647,013 A * 7/1997 Salvage ................. H04R 11/02 381/396
6,041,131 A 3/2000 Kirchhoefer et al.
6,658,134 B1 * 12/2003 van Hal ................. H04R 11/02 381/418
7,103,196 B2 9/2006 Warren
7,203,334 B2 4/2007 Schafer et al.
7,236,609 B1 6/2007 Tsangaris et al.
7,302,748 B2 12/2007 Jiles et al.
7,336,797 B2 2/2008 Thompson et al.
7,860,264 B2 12/2010 Jiles et al.
7,995,789 B2 8/2011 Tsangaris et al.
8,018,049 B2 9/2011 Minervini
8,624,385 B1 1/2014 Minervini
8,624,387 B1 1/2014 Minervini
(Continued)

FOREIGN PATENT DOCUMENTS

CN 203840067 9/2014
CN 203840177 9/2014
(Continued)

*Primary Examiner* — Bernard Rojas

(57) ABSTRACT

Various embodiments of balanced armature receivers are disclosed, where the receiver includes a yoke which retains permanent magnets, a coil assembly having a coil tunnel, and an armature coupled to the yoke, with a movable portion extending through the coil tunnel and an end portion that is free to deflect between the magnets when an excitation signal is applied to the coil assembly. There are a stationary protrusion which extends from the stationary portion of the receiver toward the movable portion of the armature, and a movable protrusion which extends from the movable portion of the armature toward the stationary portion of the receiver. The stationary and movable protrusions are offset laterally.

16 Claims, 11 Drawing Sheets

(56) References Cited

U.S. PATENT DOCUMENTS

| | | | |
|---|---|---|---|
| 8,629,552 B1 | 1/2014 | Minervini | |
| 8,704,360 B1 | 4/2014 | Minervini | |
| 8,879,767 B2 | 11/2014 | Wickstrom | |
| 9,006,880 B1 | 4/2015 | Minervini | |
| 9,023,689 B1 | 5/2015 | Minervini | |
| 9,137,605 B2 | 9/2015 | Manley et al. | |
| 9,139,421 B1 | 9/2015 | Minervini | |
| 9,148,731 B1 | 9/2015 | Minervini | |
| 9,485,585 B2 | 11/2016 | McCratic et al. | |
| 9,571,941 B2 | 2/2017 | Heidenreich et al. | |
| 9,781,505 B2 | 10/2017 | Szczech et al. | |
| 10,375,462 B2 | 8/2019 | Liu et al. | |
| 2007/0036378 A1 | 2/2007 | Saltykov et al. | |
| 2007/0201715 A1 | 8/2007 | Minervini | |
| 2013/0156235 A1 | 6/2013 | Wickstrom | |
| 2013/0279732 A1 | 10/2013 | Sanecki et al. | |
| 2013/0284537 A1 | 10/2013 | LoPresti et al. | |
| 2015/0201293 A1 | 7/2015 | Sanecki et al. | |
| 2015/0373456 A1 | 12/2015 | Dayton et al. | |
| 2016/0205463 A1 | 7/2016 | Szczech et al. | |
| 2018/0041838 A1 | 2/2018 | Chang et al. | |
| 2019/0069091 A1 | 2/2019 | Bruins et al. | |
| 2019/0208326 A1* | 7/2019 | Scheleski | H04R 9/025 |
| 2019/0342666 A1 | 11/2019 | Dayton et al. | |
| 2019/0377321 A1 | 12/2019 | Azuma et al. | |
| 2019/0387321 A1 | 12/2019 | Dayton et al. | |
| 2021/0204056 A1 | 7/2021 | Bradt et al. | |
| 2021/0400366 A1 | 12/2021 | LoPresti et al. | |
| 2022/0210576 A1 | 6/2022 | Monti et al. | |
| 2023/0045906 A1 | 2/2023 | Zhou et al. | |
| 2023/0114156 A1 | 4/2023 | Do et al. | |
| 2023/0217154 A1 | 7/2023 | Grossman et al. | |

FOREIGN PATENT DOCUMENTS

| | | |
|---|---|---|
| CN | 203840180 | 9/2014 |
| CN | 203951282 | 11/2014 |
| CN | 203951286 | 11/2014 |
| CN | 204046390 | 12/2014 |
| CN | 204046391 | 12/2014 |
| CN | 204291354 U | 4/2015 |
| CN | 204350282 U | 5/2015 |
| CN | 204350283 U | 5/2015 |
| CN | 204350285 U | 5/2015 |
| CN | 204350286 U | 5/2015 |
| CN | 205595924 | 9/2016 |
| CN | 205595999 | 9/2016 |
| CN | 205830004 U | 12/2016 |
| CN | 206879077 U | 1/2018 |
| CN | 214070149 U | 8/2021 |
| CN | 214429687 U | 10/2021 |
| IN | 205584474 | 9/2016 |
| PH | 22021050264 U1 | 7/2021 |
| PH | 22021050699 | 3/2022 |
| VN | 29365 A | 4/2012 |

* cited by examiner

FIG. 10
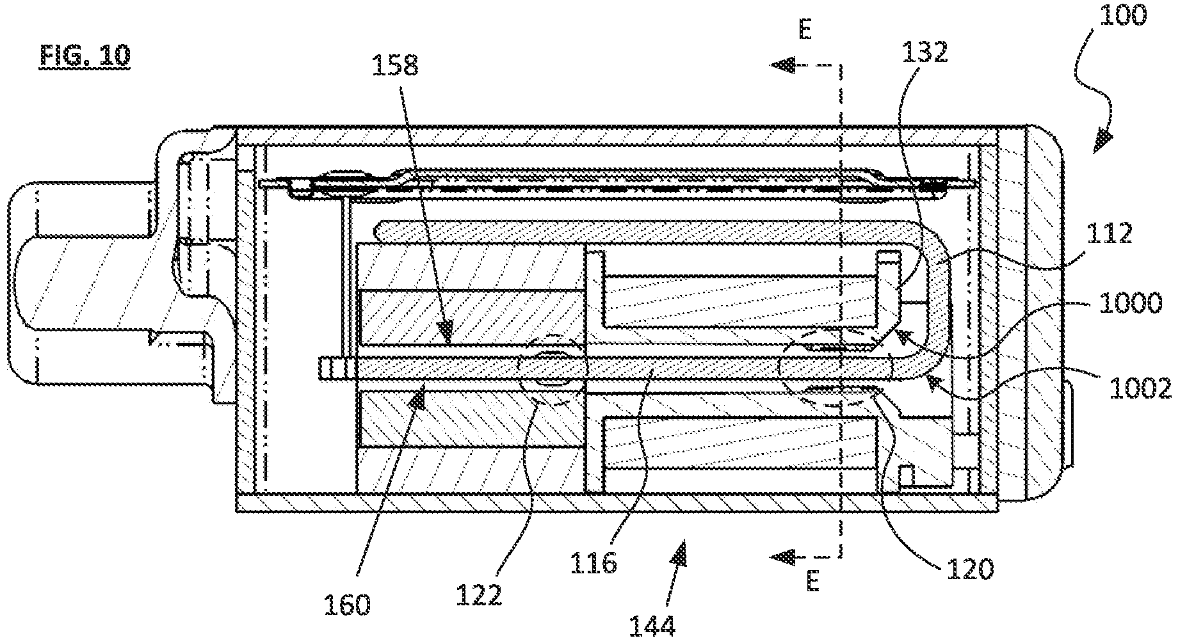
FIG. 11
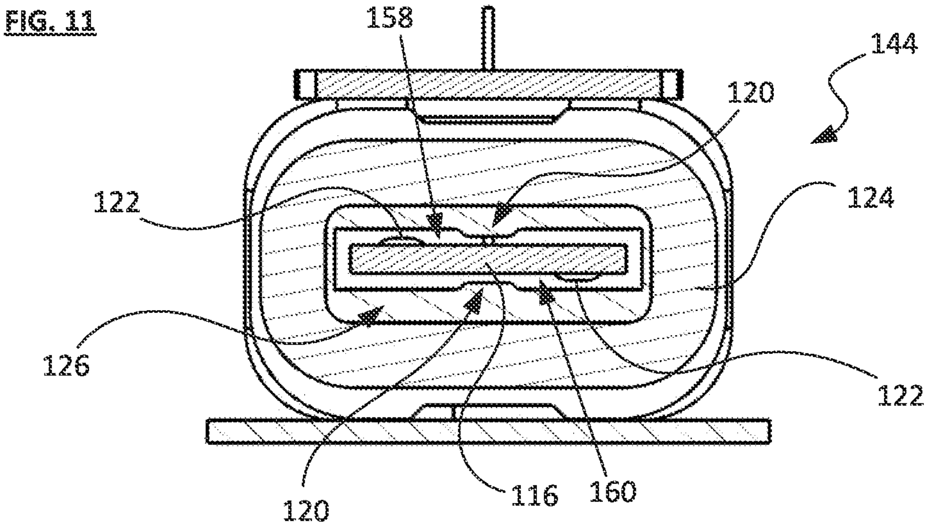
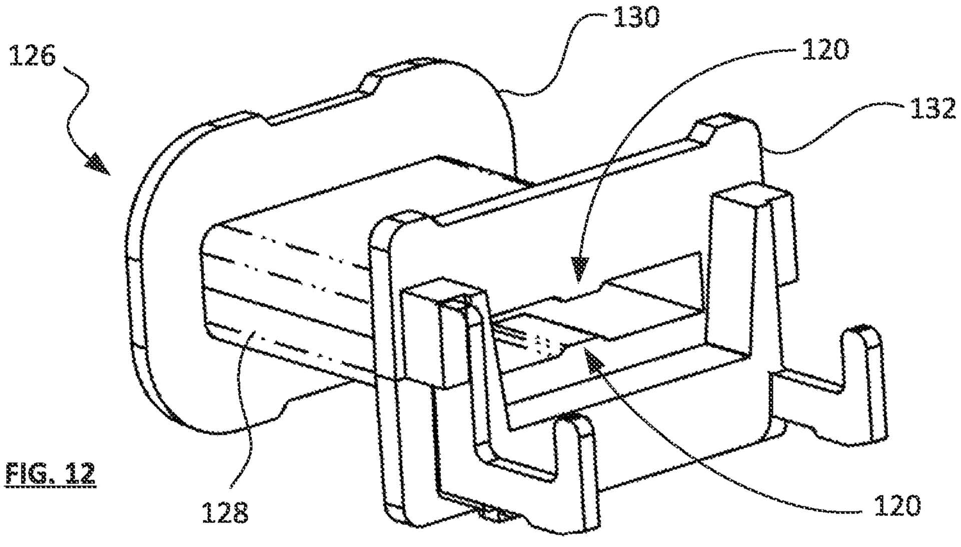
FIG. 12

SHOCK PROTECTION IMPLEMENTED IN A BALANCED ARMATURE RECEIVER

TECHNICAL FIELD

This disclosure relates generally to acoustic receivers and more specifically to shock protection mechanisms implemented in balanced armature receivers.

BACKGROUND

Many hearing instruments such as hearing aids, earphones, and personal audio headsets, among other devices include one or more balanced armature receivers, also referred to herein as "acoustic receivers" or "receivers". Such receivers generally comprise a case or housing containing a diaphragm that divides an interior of the housing into front and back volumes. A motor located in the back volume includes an electrical coil with a passage through which an armature (also called a reed) is disposed. The armature has a stationary end fixed to a yoke and another end movably disposed between magnets supported by the yoke. A drive rod or other link couples the armature to the diaphragm. In operation, an electrical signal applied to the electrical coil causes the armature to vibrate between the magnets. The vibrating armature moves the diaphragm, resulting in emission of sound from an aperture in the front volume of the housing. However, external forces or shocks that are applied to the receiver may damage the internal components such as the armature, thereby reducing performance of the receiver.

BRIEF DESCRIPTION OF THE DRAWINGS

FIG. 10 is a side sectional view of a balanced armature receiver according to some embodiments;

FIG. 11 is a side sectional view of the balanced armature receiver of FIG. 10 when cut and viewed along the line E-E;

FIG. 12 is a perspective view of a coil bobbin without the coil as implemented in the balanced armature receiver of FIGS. 10 and 11, according to some embodiments;

Figure 1:
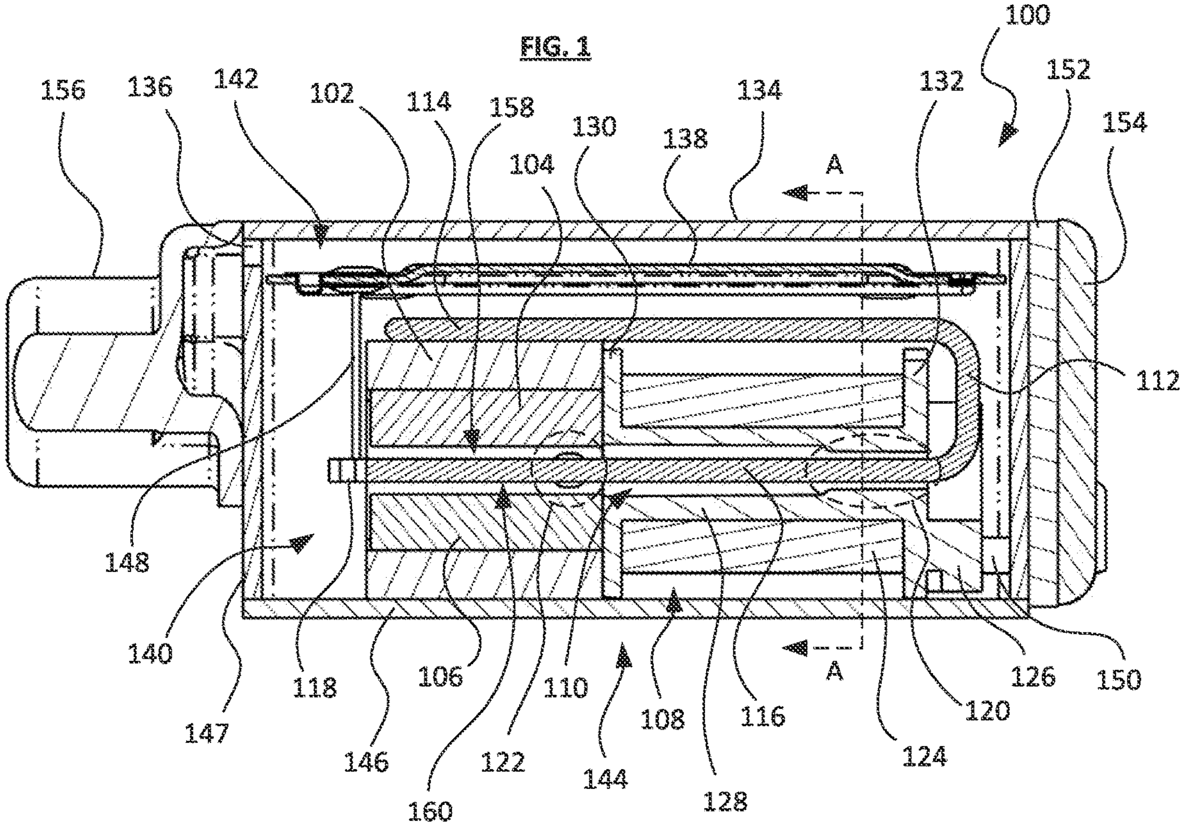
FIG. 1 is a side sectional view of a balanced armature receiver according to some embodiments.

Those of ordinary skill in the art will appreciate that elements in the figures are illustrated for simplicity and clarity. It will be further appreciated that certain actions or steps may be described or depicted in a particular order of occurrence while those of ordinary skill in the art will understand that such specificity with respect to sequence is not actually required unless a particular order is specifically indicated. It will also be understood that the terms and expressions used herein have meanings accorded to such terms and expressions by those having ordinary skill in the art except where specific meanings have otherwise been set forth herein.

DETAILED DESCRIPTION

The present disclosure pertains to balanced armature receivers in one of numerous different implementations. Such receivers are typically integrated in hearing aids such as behind-the-ear (BTE) devices with a portion that extends into or on the ear, in-the-canal (ITC) or partially in the ear canal devices, receiver-in-canal (RIC) devices, as well as headsets, wired or wireless in-the-ear (ITE) earbuds or earpieces, among other devices that produce an acoustic output signal in response to an electrical input signal and intended are for use on, in, or in close proximity to a user's ear.

In one implementation, the balanced armature receiver includes a yoke retaining first and second permanent magnets in spaced-apart relation, a coil assembly having a coil tunnel, and an armature having a portion coupled to the yoke, a movable portion that extends through the coil tunnel, and an end portion located at least partially between the magnets. The end portion is free to deflect between the magnets in response to an excitation signal applied to the coil assembly. The receiver also includes a stationary protrusion extending from a stationary portion of the receiver toward the movable portion of the armature, and a movable protrusion extending from the movable portion of the armature toward the stationary portion of the receiver. The stationary and movable protrusions are offset laterally. In some embodiments according to the above implementation, the stationary and movable protrusions are offset longitudinally. In some embodiments according to the above implementation, the stationary and movable protrusions are offset both laterally and longitudinally.

In some embodiments, the stationary portion of the receiver is the coil assembly or one of the magnets. In some examples of such embodiments, the coil assembly has a first end and a second end adjacent to the magnets. The second end of the coil assembly is opposite the first end of the coil assembly, and the stationary protrusion extends from a surface of the coil assembly proximate the first end of the coil assembly. In some other examples of such embodiments, the coil assembly includes a coil, an insulator disposed on the coil, and an epoxy on a surface of the coil. The epoxy forms the stationary protrusion.

In yet other examples of the embodiments, the coil assembly includes a coil and a bobbin, where the bobbin includes a coil support member having the tunnel extending between a first end and a second end of the coil support member, a first flange extending from the coil support member, and a second flange extending from the coil support member and spaced apart from the first flange. The coil is disposed about the coil support member between the first and second flanges, and the bobbin forms the stationary protrusion. In some examples, the stationary protrusion is formed proximate the first flange and the second flange is nearer the magnets than the first flange.

In some examples of the embodiments, the coil assembly includes a coil and a movement-restricting spacer disposed on one end of the coil. The spacer forms the stationary protrusion. In some other examples of the embodiments, the magnets include a first end and a second end adjacent to the coil assembly. The second end of the magnets are opposite the first end of the magnets. The stationary protrusion extends from a surface of the magnets proximate the second end of the magnets.

In some embodiments, the receiver includes a plurality of stationary protrusions extending from the stationary portion of the receiver toward the movable portion. In some examples of the embodiments, the plurality of stationary protrusions are offset laterally or longitudinally from each other.

In some embodiments, the receiver includes a plurality of movable protrusions extending from the movable portion toward the stationary portion of the receiver. In some examples of the embodiments, the plurality of movable protrusions are offset laterally or longitudinally from each other. In some examples of the embodiments, the plurality of movable protrusions include a first movable protrusion proximate the coil assembly and a second movable protrusion proximate one of the magnets.

In some embodiments, the receiver includes a plurality of stationary protrusions extending from the stationary portion of the receiver toward the movable portion as well as first and second movable protrusions positioned on opposing sides of the movable portion of the armature. In some examples, the plurality of stationary protrusions include first and second pairs of stationary protrusions positioned adjacent opposing sides of the movable portion of the armature. In some other examples, the plurality of stationary protrusions include first and second stationary protrusions positioned adjacent opposing sides of the movable portion of the armature.

FIGS. 1, 4A, 4B, 8, 10, 13, and 15 illustrate examples of an acoustic receiver such as a balanced armature receiver 100 that includes the means of shock protection described herein. The receiver has a yoke 102 retaining a first permanent magnet 104 and a second permanent magnet 106 in spaced-apart relation. The receiver also has a coil assembly 108 with a coil tunnel 110. In some examples, the coil tunnel may be aligned with a space between the magnets 104 and 106. The receiver has an armature 112, for example a metal strip or reed, with a portion 114 of the armature coupled to the yoke and a movable portion 116 of the armature extending through the coil tunnel, as well as an end portion 118 located at least partially between the magnets. The end portion 118 of the armature is free to deflect between the magnets in response to an excitation signal applied to the coil assembly 108.

The receiver also has at least one stationary protrusion 120 and at least one movable protrusion 122 that extend from various parts of the receiver. For example, the stationary protrusion (or protrusions) extends from a stationary portion of the receiver toward the movable portion 116 of the armature. The stationary portion of the receiver may refer to a surface or section of any suitable stationary subcomponent of the receiver. In some examples, the stationary portion of the receiver is the coil assembly. In some examples, the stationary portion is one of the magnets. In other examples, the stationary portion is part of a spacer, also known as a "snubber."

The movable protrusion (or protrusions) extends from the movable portion of the armature toward the stationary portion of the receiver from which the stationary protrusions extend. In some examples, the stationary protrusions may be offset laterally with respect to the movable protrusions, that is, the stationary protrusions and the movable protrusions are not aligned with respect to an axis that extends perpendicularly to a direction in which the armature extends. In some examples, the stationary protrusions may be additionally or alternatively offset longitudinally with respect to the movable protrusions, that is, the stationary protrusions and the movable protrusions are not aligned with respect to an axis that extends parallel to the direction in which the armature extends.

In some examples, any one or more of the stationary or movable protrusions may be formed by applying a mechanical force to the receiver component, for example the movable portion of the armature, from which the protrusions are configured to extend. In some examples, any one or more of the stationary or movable protrusions may be formed by attaching or applying a polymeric material, for example epoxy, on a surface of the receiver component from which the protrusions are configured to extend. In some examples, the stationary protrusions and the movable protrusions are formed using a solid material such as plastic (e.g., when the epoxy or other suitable polymeric material solidifies after being applied to a surface) or metal (e.g., when the stationary protrusions are formed by applying pressure or force to deform a portion of the movable portion of the armature). In some examples, the stationary protrusions or the movable protrusions are formed using a compliant, flexible, or elastic material.

The receiver has a housing 134 (e.g., a metal or plastic casing) with a sound port 136. A diaphragm 138 (which may include a movable paddle and a flexible membrane, for example) separates an internal volume of the housing into a back volume 140 and a front volume 142 such that the front volume is acoustically coupled with the sound port and the back volume at least partially contains a receiver motor 144. The motor 144 may be fastened to a bottom wall portion 146 of the housing. The housing may also have a sidewall portion 147 extending from the bottom wall portion 146 and surrounding the motor.

Figure 3:
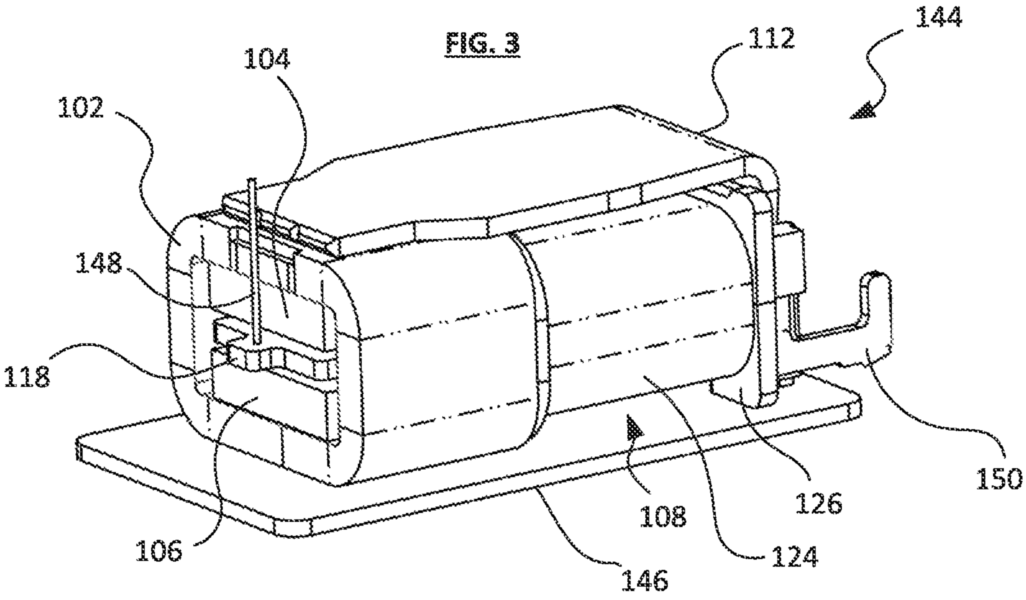
FIG. 3 is a perspective view of a motor of FIG. 1, according to some embodiments.
Figure 4A:
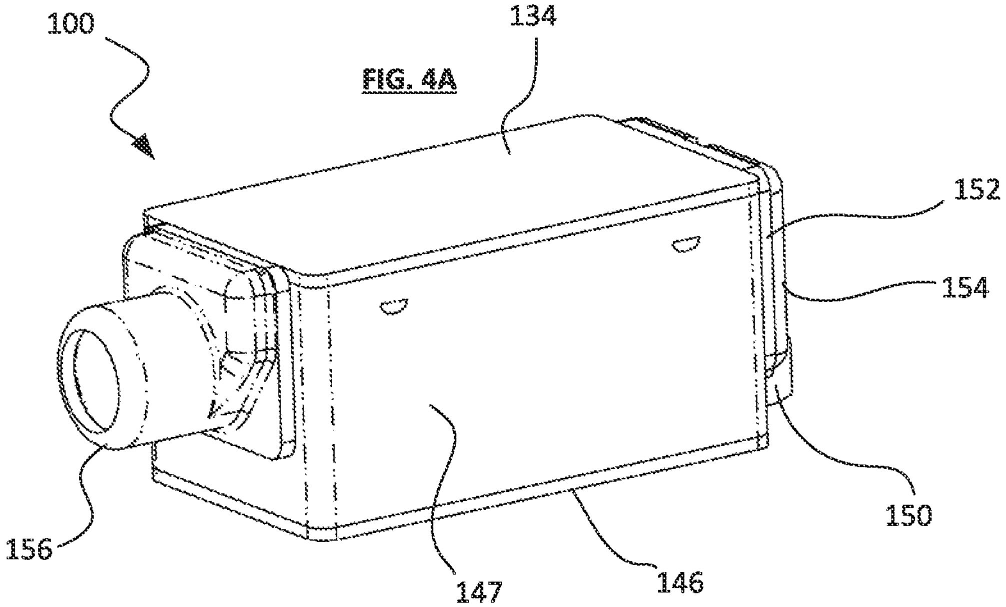
FIG. 4A is a perspective view of the balanced armature receiver of FIG. 1, according to some embodiments.
Figure 4B:
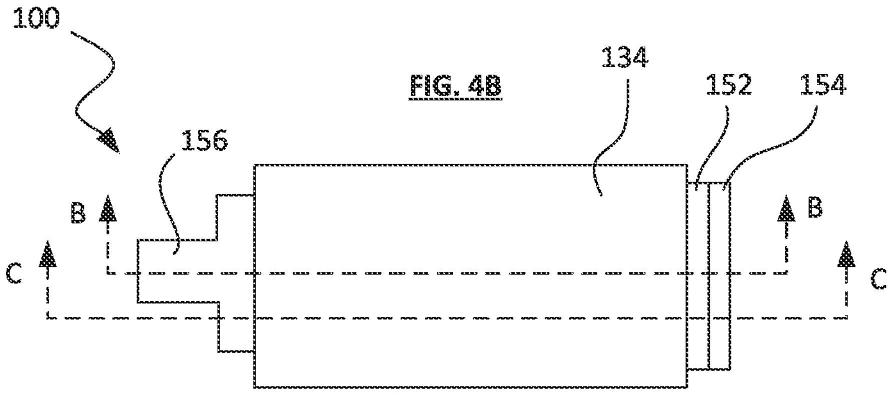
FIG. 4B is a top view of the balanced armature receiver of FIG. 4A.
Figure 5:
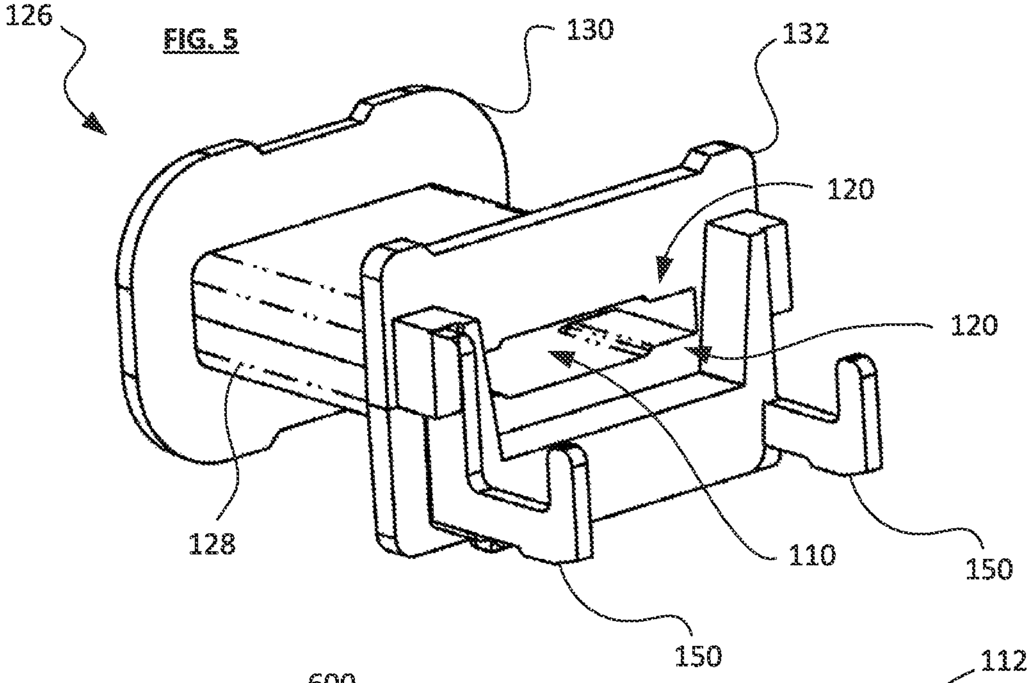
FIG. 5 is a perspective view of a coil bobbin without the coil, according to some embodiments.
Figure 6:
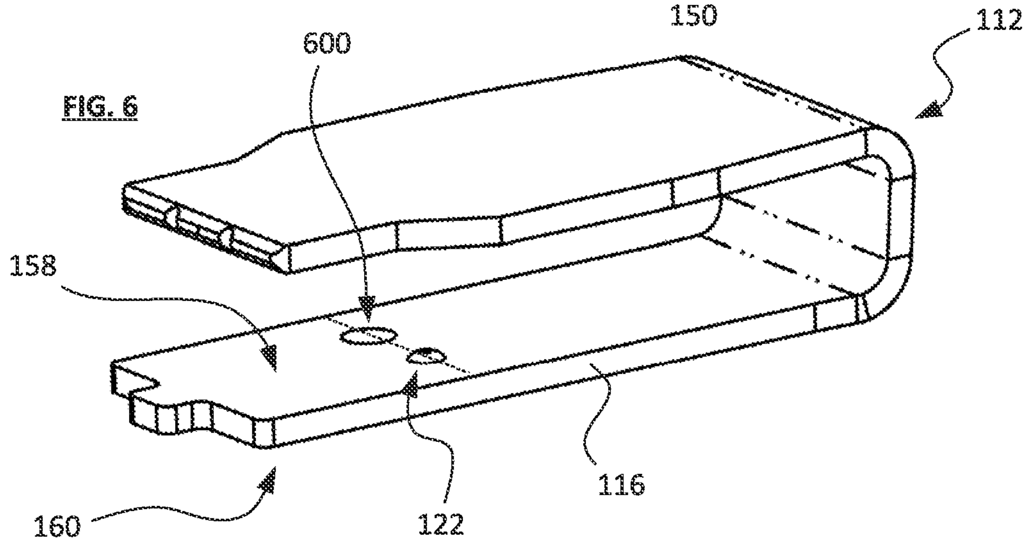
FIG. 6 is a perspective view of an armature with protrusions, according to some embodiments.
Figure 8:
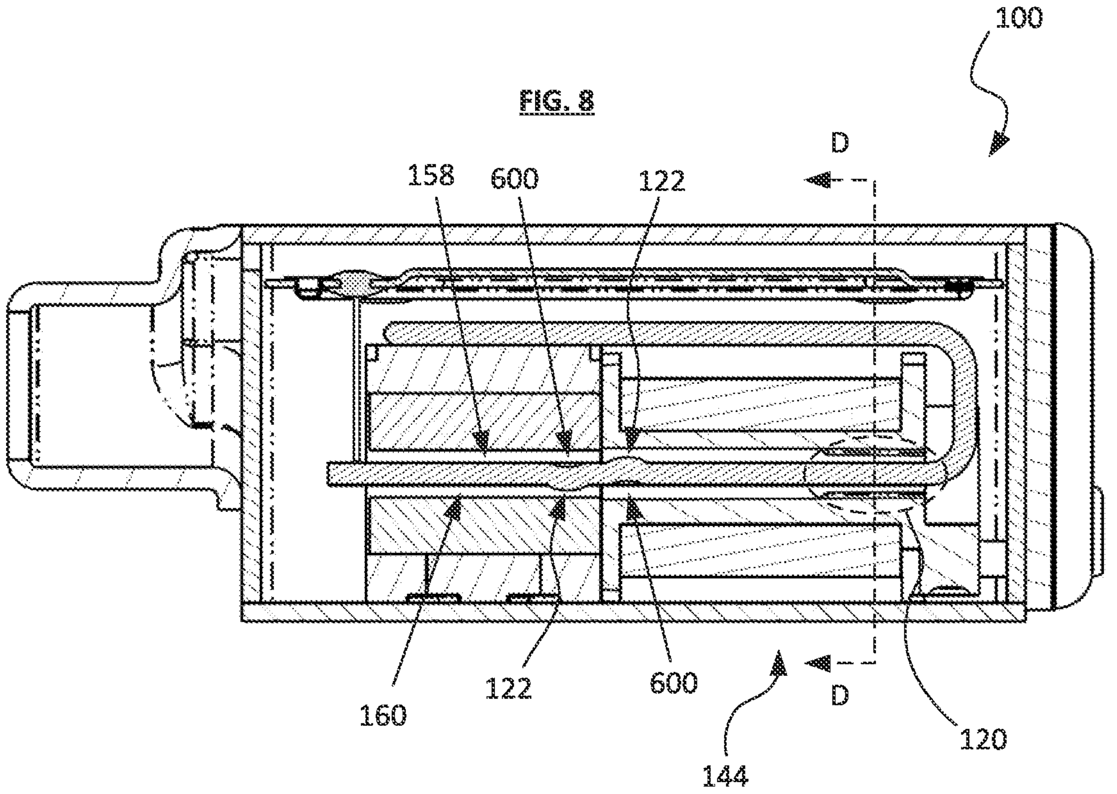
FIG. 8 is a side sectional view of a balanced armature receiver along line B-B in FIG. 4B.

FIG. 3 illustrates an example of the motor 144 which includes the yoke 102, the coil assembly 108, and the armature 112. The coil assembly 108 minimally comprises a coil 124 and an electrically insulating component or element. In some embodiments, for example in FIGS. 1, 3, 8, and 10, the insulating component is a bobbin 126. These figures are cutaway views of the receiver 100 shown in FIGS. 4A and 4B, where FIG. 4B is a top view of the receiver in FIG. 4A. FIG. 8 is a cutaway view of the receiver when the receiver is dissected along a longitudinal centerline B-B and viewed in the direction specified by the arrows as shown in FIG. 4B. FIGS. 1, 10, 13, 14, 15, and 23 are cutaway views of different embodiments of the receiver when the receiver is cross-sectioned along an offset line C-C, which extends longitudinally between the centerline B-B and the sidewall portion 147, and viewed in the direction specified by the arrows as shown.

The bobbin includes a coil support member 128 having the coil tunnel 110 extending between the two ends of the coil support member, and two flanges 130 and 132. The first flange 130 extends from the coil support member at a first location of the coil support member, and the second flange 132 extends from the coil support member at another, second location of the coil support member different from the first location such that the two flanges are spaced apart. The coil 124 is disposed about the coil support member 128 between the first flange and the second flange, and the bobbin 126 forms the stationary protrusions 120. The receiver motor also includes a link or drive rod 148 that interconnects the diaphragm 138 and the end portion 118 of the armature.

The bobbin 126 includes conductive pins 150 extending therefrom. The housing 134 further includes an opening (not shown) in the sidewall portion 147 through which a portion of each of the conductive pins 150 extends or protrudes to an external side of the housing, which is where a terminal board 152 may be located. In some examples, the conductive pins, or at least a portion of the conductive pins, may be electrically coupled with the terminal board via a solder 154 which also fixes the conductive pins relative to the terminal board.

In some of the examples where the bobbin is implemented, the bobbin defines the stationary protrusions 120 as well as the coil tunnel 110. That is, the coil support member and/or the flange(s) may define the location and configuration of the stationary protrusions, and the coil support member defines the shape and size of the coil tunnel. For example, the stationary protrusion may be formed proximate the first flange, and the second flange is nearer the magnets than the first flange. In examples where the bobbin is not implemented, other components may define the protrusions and the coil tunnel, as explained herein.

In some embodiments, as illustrated, the housing 134 further includes a sound tube or nozzle 156 acoustically coupled with the sound port 136. In some examples, the sound tube or nozzle extends longitudinally from the housing on an opposite side from the terminal board or the opening through which the conductive pins at least partially extend. In some examples, the sound tube or nozzle is located on some other side of the housing.

Figure 2:
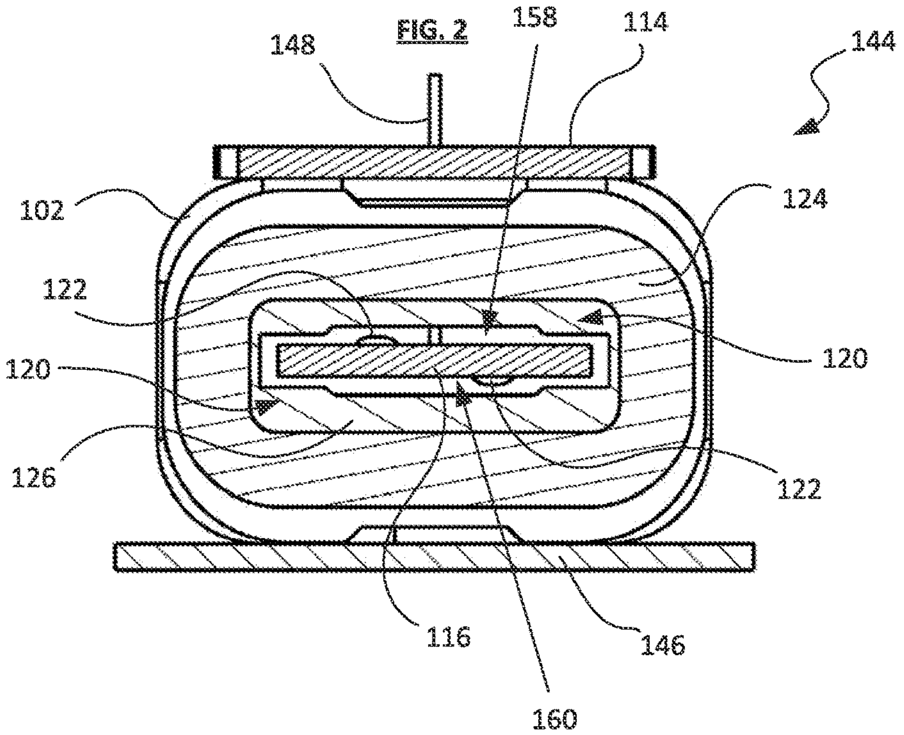
FIG. 2 is a side sectional view of the balanced armature receiver of FIG. 1 when cut and viewed along the line A-A.
Figure 9:
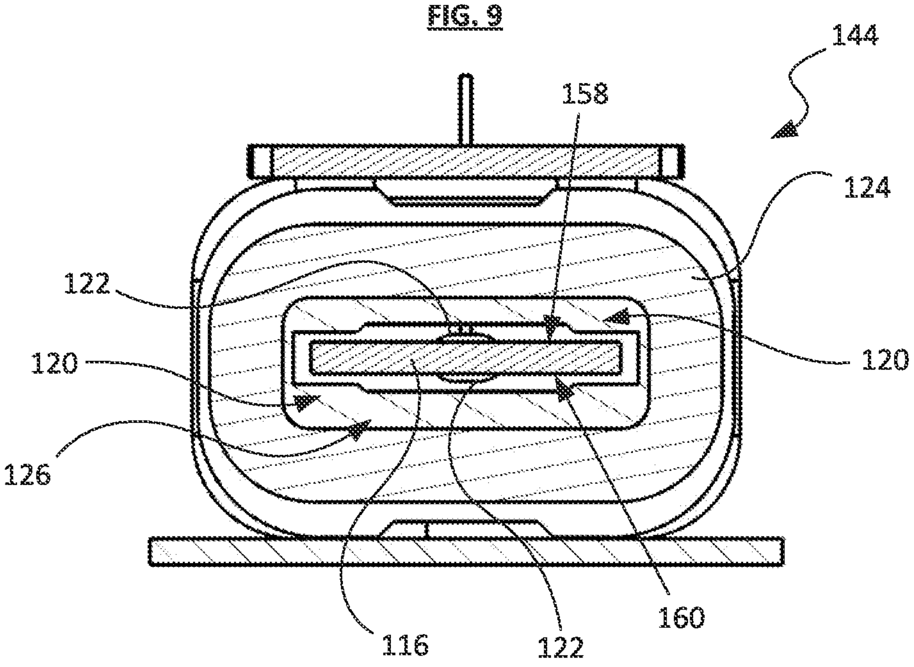
FIG. 9 is a side sectional view of the balanced armature receiver of FIG. 8 when cut and viewed along the line D-D.
Figure 13:
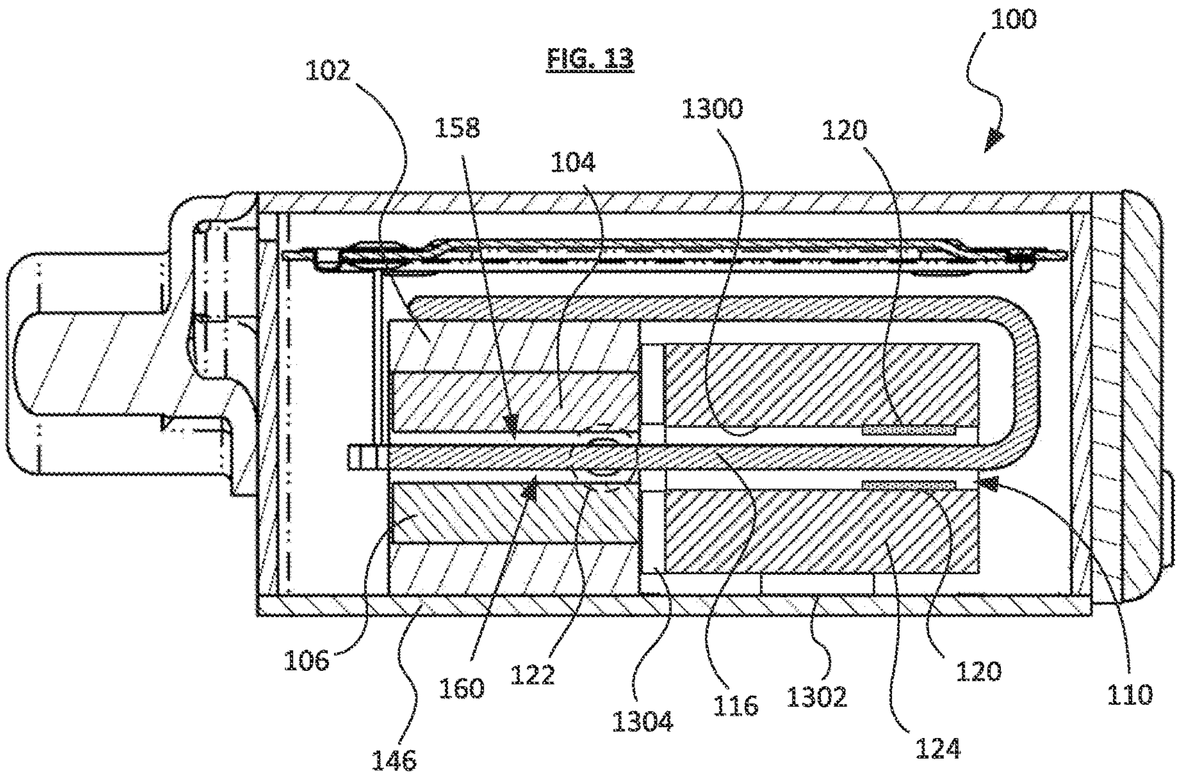
FIG. 13 is a side sectional view of a balanced armature receiver according to some embodiments.

FIGS. 2, 9, and 11 illustrate examples of the motor 144 shown as cutaway views based on the receivers 100 shown in FIGS. 1, 8, and 10, respectively. FIG. 2 is a cutaway view of the receiver in FIG. 1 along the line A-A and in the direction specified by the arrows. FIG. 9 is a cutaway view of the receiver in FIG. 8 along the line D-D and in the direction specified by the arrows. FIG. 11 is a cutaway view of the receiver in FIG. 10 along the line E-E and in the direction specified by the arrows.

In FIGS. 2, 5, 8, and 9, the stationary protrusions 120 include four (4) stationary protrusions, or two pairs of stationary protrusions, defined by the bobbin 126. The first pair of stationary protrusions may be positioned adjacent one side of the movable portion 116 of the armature while the second pair of stationary protrusions may be positioned adjacent the opposing side of the movable portion from the first pair. The stationary protrusions may be referred to as "ribs" because these protrusions are continuous extensions of the bobbin. The ribs may extend from one end of the bobbin at least partially into the coil tunnel 110 defined by the coil support member 128 of the bobbin. The stationary protrusions in this example are formed along the corners of the coil tunnel such that the cross-section of the coil tunnel resembles a cross-like shape, or a shape resembling the plus sign ("+"), in this section of the bobbin. The cross-section of the coil tunnel at a section closer to the magnets may assume a different shape from the cross-like configuration caused by the stationary protrusions, for example rectangular, ovular, etc.

In FIGS. 10-12, the stationary protrusions 120 include two (2) stationary protrusions, or a pair of stationary protrusions, defined by the bobbin 126. The first stationary protrusion may be formed or positioned on one side of the movable portion 116 of the armature while the second stationary protrusion may be positioned adjacent the opposing side of the movable portion from the first pair. The stationary protrusions in these examples are formed not along the corners of the coil tunnel 110 but are centered with respect to the width of the bobbin such that the cross-section of the coil tunnel resembles an H-like shape in this section of the bobbin, where the middle portion has the narrowest cross-sectional length or height.

In FIGS. 1, 2, 6, 10, 11, 13-15, and 23, the movable protrusions 122 include two (2) movable protrusions extending from the movable portion 116 of the armature 112, such that the movable protrusions are offset from each other and aligned laterally with respect to each other, i.e. the movable protrusions are positioned along a line extending in the direction substantially perpendicular to the direction in which the movable portion of the armature extends. The movable protrusions extend from a first surface 158 and a second surface 160 of the movable portion toward the first magnet 104 and the second magnet 106, respectively. One of the two movable protrusions extends from the first surface of the movable portion of the armature (for example, upward), while the other of the two movable protrusions extends from the second surface, opposite from the first surface, of the movable portion (for example, downward).

Figure 7:
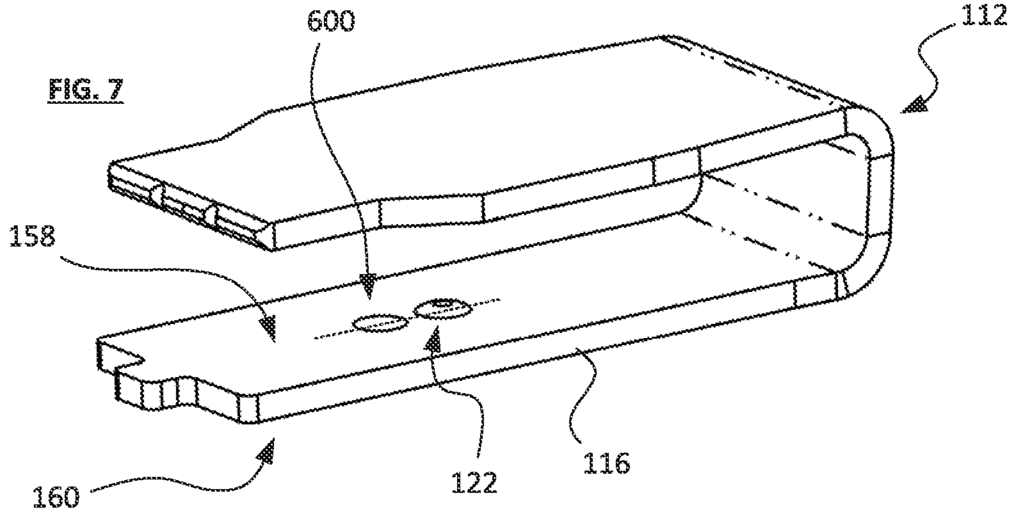
FIG. 7 is a perspective view of another armature with protrusions, according to some embodiments.

In FIGS. 7-9, the movable protrusions 122 include two (2) movable protrusions extending from the movable portion 116 of the armature 112, such that the movable protrusions are offset from each other and aligned longitudinally with respect to each other, i.e. the movable protrusions are positioned along a line extending in the direction substantially parallel to the direction in which the movable portion of the armature extends. One of the two movable protrusions extends from the first surface 158 of the movable portion of the armature, while the other of the two movable protrusions extends from the second surface 160 of the movable portion.

FIG. 10 illustrates an example of the receiver 100 in which the bobbin 126 has a chamfered section 1000 in the second flange 132. The chamfered section forms an angled section (or in some cases a curved section) resembling a funnel-like shape into which the movable portion 116 of the armature 112 extends. The chamfered section may either be pre-formed in the second flange or formed by cutting one or more of the corners of the second flange which partially defines the coil tunnel 110, or at least the entrance portion thereof, to reduce the likelihood of the armature, or a curved section 1002 of the armature, from contacting the second flange 132 in the event that an external force is applied to the receiver.

FIGS. 13-15 and 23 illustrate examples of the receiver 100 in which the bobbin 126 is not implemented. In these examples, the coil assembly 108 includes the coil 124 that is self-supporting, that is, the coil does not need to be supported by the coil support member 128 of the bobbin. In some examples, this is achieved by packing the coil in an electrically insulative material, for example plastic or enamel, such that the coil maintains its form. In some examples, an adhesive such as glue, bond, or epoxy, among others, may be applied to the coil, e.g. via surface coating, to maintain its form. As such, the coil defines its own shape and form, as well as the coil tunnel and, in some examples, also the stationary protrusions 120. In some examples, the stationary protrusions are formed by one or more additional winding of the coil such that the stationary protrusions may be coated with an insulating material.

In some examples, the bottom wall portion 146 of the housing may include an adhesive 1302 to attach the coil to the housing. Additionally or alternatively, an adhesive 1304 may be disposed between the coil and the magnets 104, 106 and/or the yoke 102 such that the coil can be attached to an end of the magnets and/or the yoke. The adhesive may be glue, bond, or epoxy, among others, which facilitates fixedly attaching the coil to the bottom wall portion of the housing so as to fix the position of the coil in the housing and align the coil tunnel with the space between the magnets In some examples, the adhesive may be made of an electrically insulative material.

Figure 15:
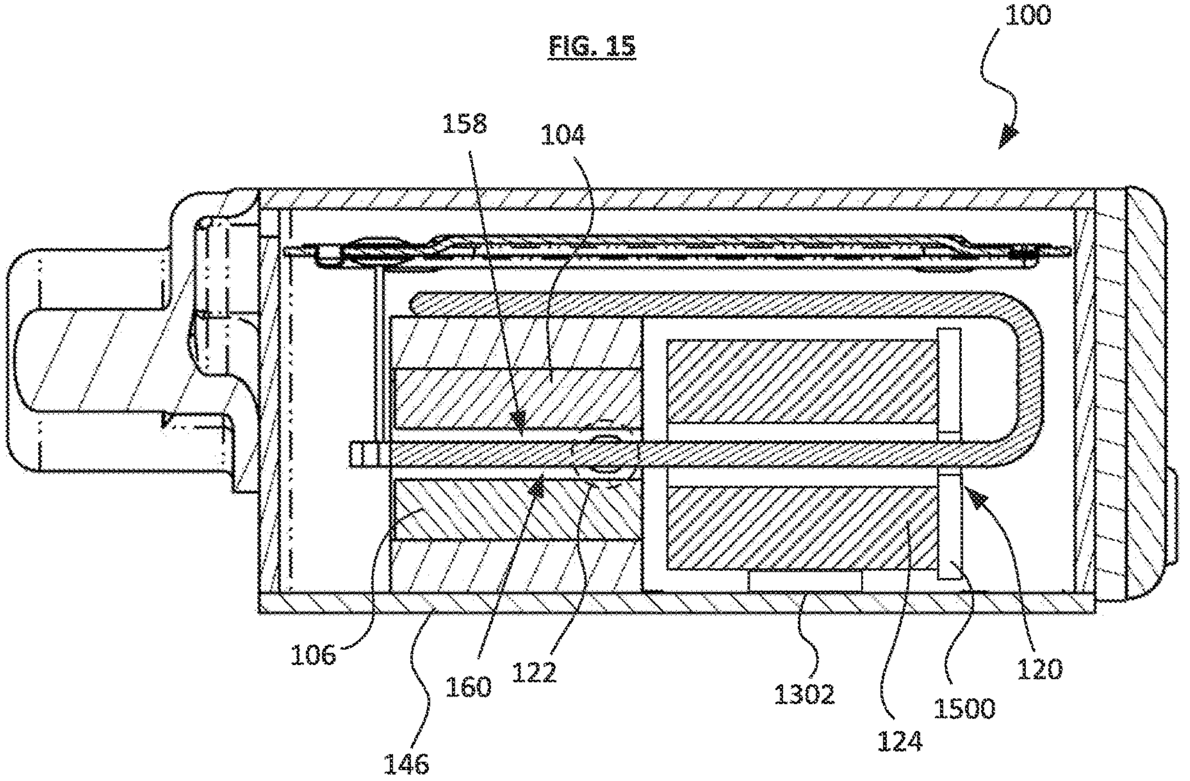
FIG. 15 is a side sectional view of a balanced armature receiver according to some embodiments.
Figure 16:
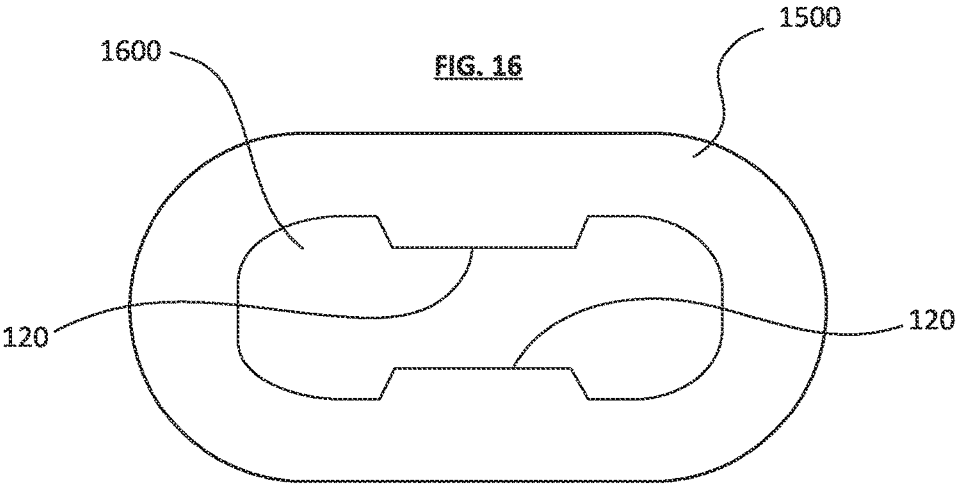
FIG. 16 illustrates a spacer as implemented in the balanced armature receiver of FIG. 15, according to some embodiments.

In FIG. 15, the coil assembly 108 includes the coil 124 and a movement-restricting spacer 1500 disposed on one end of the coil to form the stationary protrusions 120. That is, the spacer 1500 has an opening 1600, as shown in FIG. 16, which defines the shape and size of the stationary protrusions, each of which extends toward the armature. The spacer is suitably sized and positioned at the end of the coil that is opposite from the magnets 104, 106 such that the stationary protrusions formed by the spacer restrict movements of the movable portion 116 of the armature.

FIGS. 13, 14, and 17-22 illustrate the examples in which the stationary protrusions 120 are formed or positioned on the coil 124. The stationary protrusions 120 are formed or positioned on an inner surface 1300 of the coil 124 by either attaching or applying a polymeric material which may be any suitable material. The polymeric material in some examples may be epoxy, which hardens into a solid protrusion extending from the inner surface of the coil. The inner surface defines the coil tunnel 110 of the coil. The stationary protrusions 120 may be formed at any location inside the coil tunnel, for example either proximal to an end of the coil tunnel through which the movable portion 116 of the armature is extended, or proximal to the magnets. The coil also has two coil leads 1700 extending therefrom to be electrically coupled with the terminal board 152.

Figure 14:
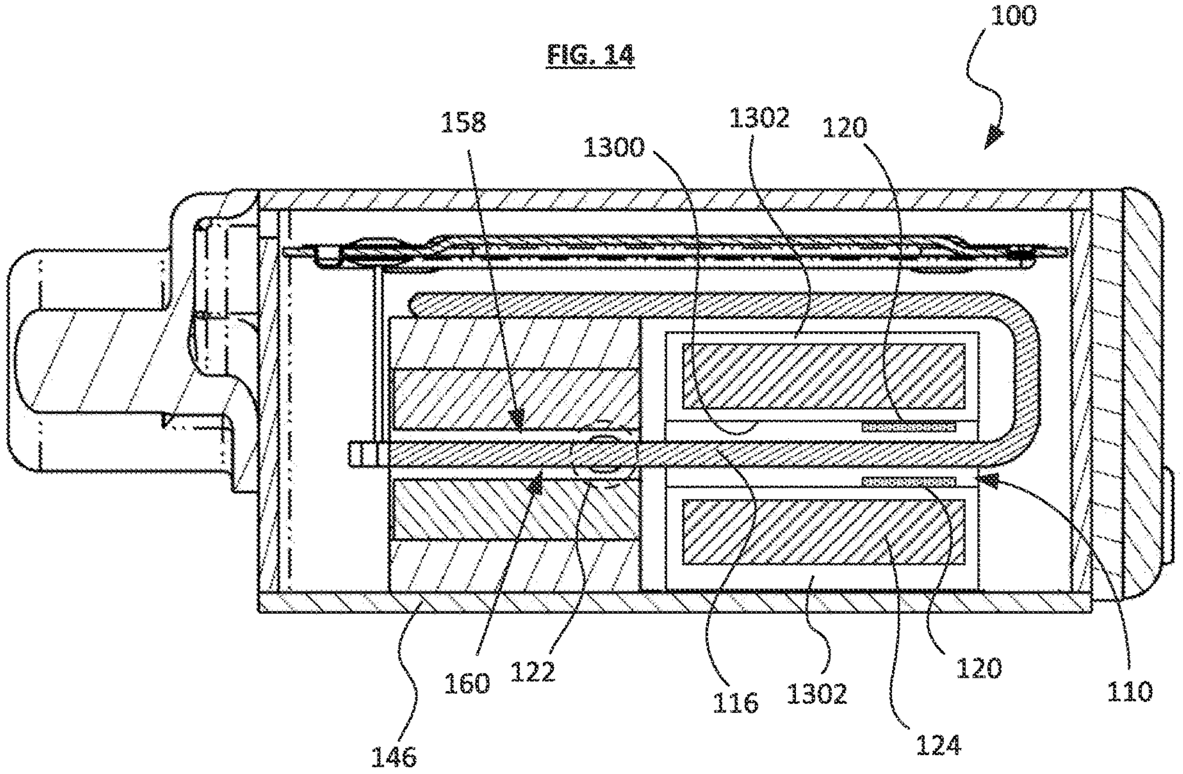
FIG. 14 is a side sectional view of a balanced armature receiver according to some embodiments.

FIG. 14 illustrates the example in which the coil 124 is at least partially enclosed in or surrounded by the adhesive 1302 which may be a coating of enamel and/or insulative adhesive, for example, applied on the coil in order to from insulation at least partially around the coil. In some examples, an outer surface of the coil may be covered by the insulating element. The stationary protrusions 120, therefore, may be formed or positioned on the inner surface 1300 of the insulation component surrounding the coil, instead of directly onto the inner surface of the coil itself.

Figure 17:
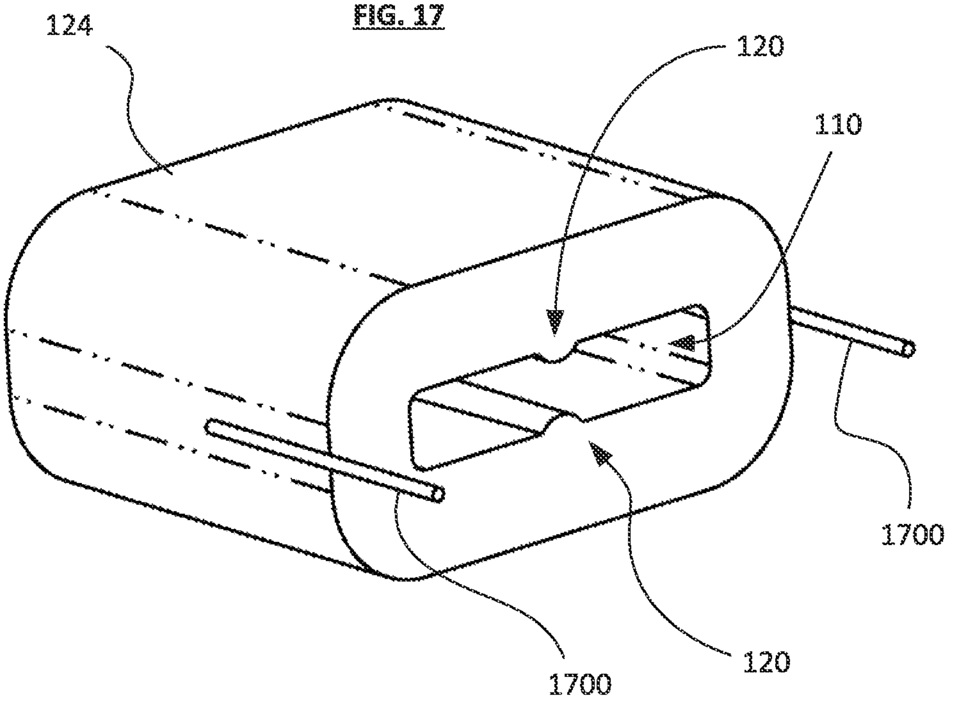
FIG. 17 is a perspective view of a self-supporting coil according to some embodiments.
Figure 18:
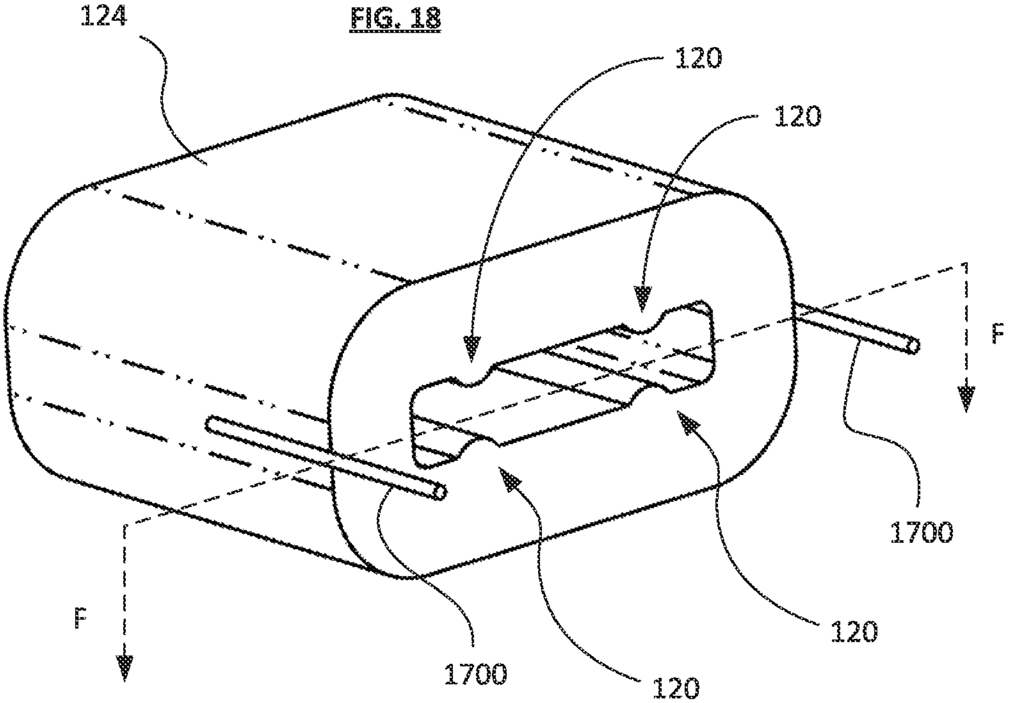
FIG. 18 is a perspective view of another self-supporting coil according to some embodiments.
Figure 19:
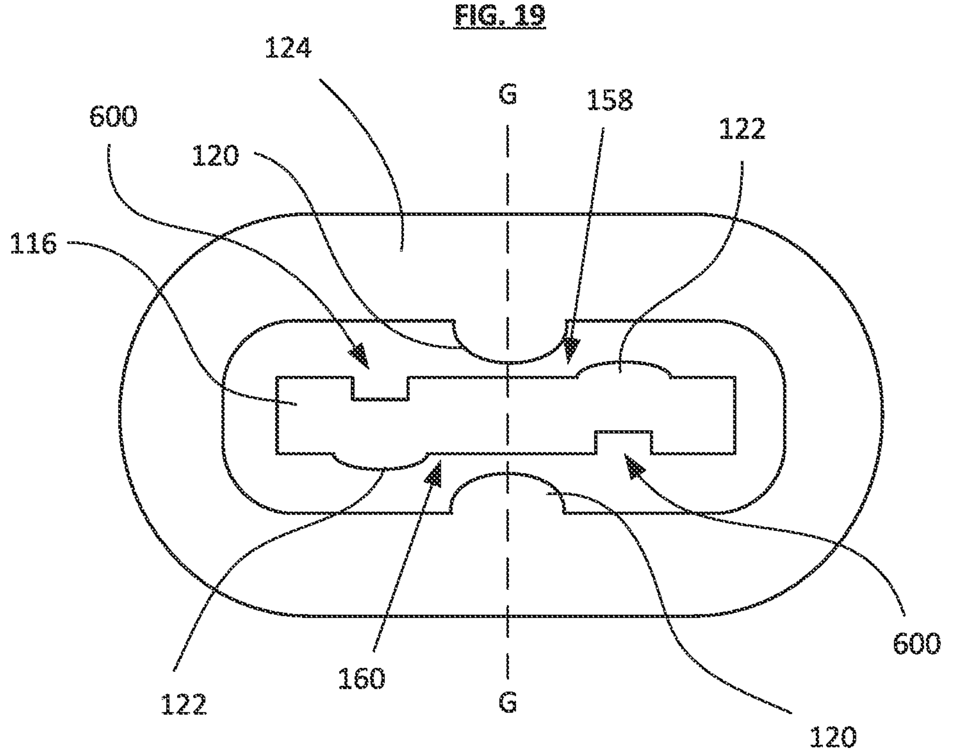
FIG. 19 is a cross-sectional view of the self-supporting coil of FIG. 17 with an armature extending therethrough, according to some embodiments.
Figure 20:
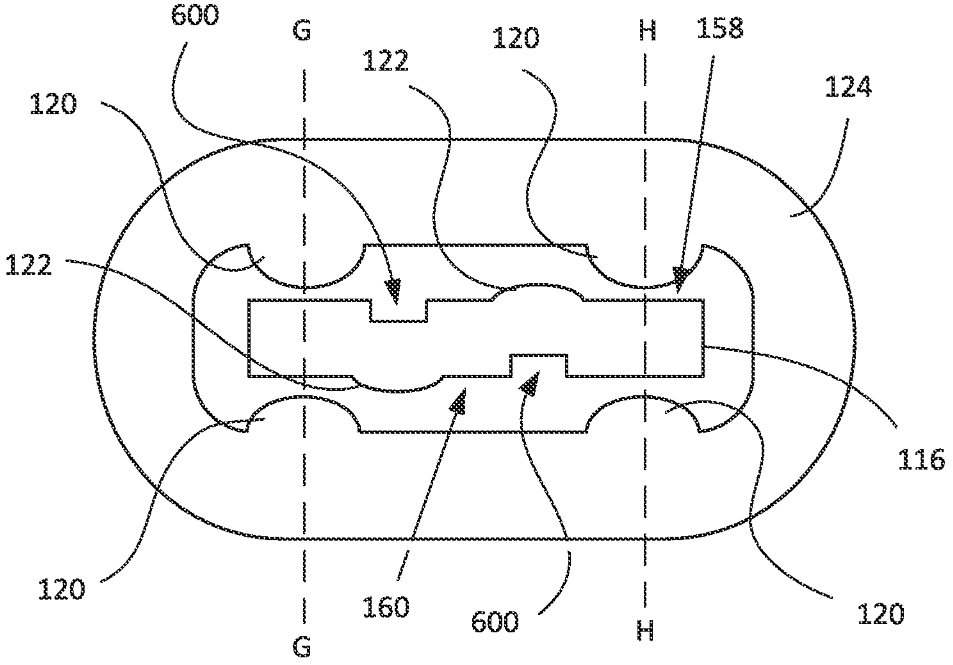
FIG. 20 is a cross-sectional view of the self-supporting coil of FIG. 18 with an armature extending therethrough, according to some embodiments.

FIGS. 17 and 19 illustrate the examples in which the stationary protrusions 120 include two (2) stationary protrusions, or a pair of stationary protrusions, that are formed or positioned on the coil 124 along a vertical line G-G and extending longitudinally along a distance in the coil tunnel 110. The vertical line G-G may extend along the center of the coil. As such, the cross-section of the coil tunnel where the stationary protrusions are located would resemble the H-shape, with the middle portion along the centerline having the narrowest cross-sectional length or height. The stationary protrusions 120 are located between the movable protrusions 122 of the movable portion 116 of the armature. In some embodiments, the stationary protrusions and the movable protrusions will also be longitudinally spaced apart with respect to each other.

FIGS. 18 and 20-22 illustrate the examples in which the stationary protrusions 120 include four (4) stationary protrusions, or two pairs of stationary protrusions, that are formed or positioned on the coil 124 along two vertical lines G-G and H-H, that is, two stationary protrusions along each vertical line, and extending longitudinally along a distance in the coil tunnel 110. As such, the cross-section of the coil tunnel where the stationary protrusions are located would resemble a "candy wrapper" shape, where there are two sections (where the stationary protrusions are formed) with narrower cross-sectional length or height. The movable protrusions 122 of the movable portion 116 of the armature are located between the stationary protrusions 120 in these examples. In some embodiments, the stationary protrusions and the movable protrusions will also be longitudinally spaced apart with respect to each other.

Figure 21:
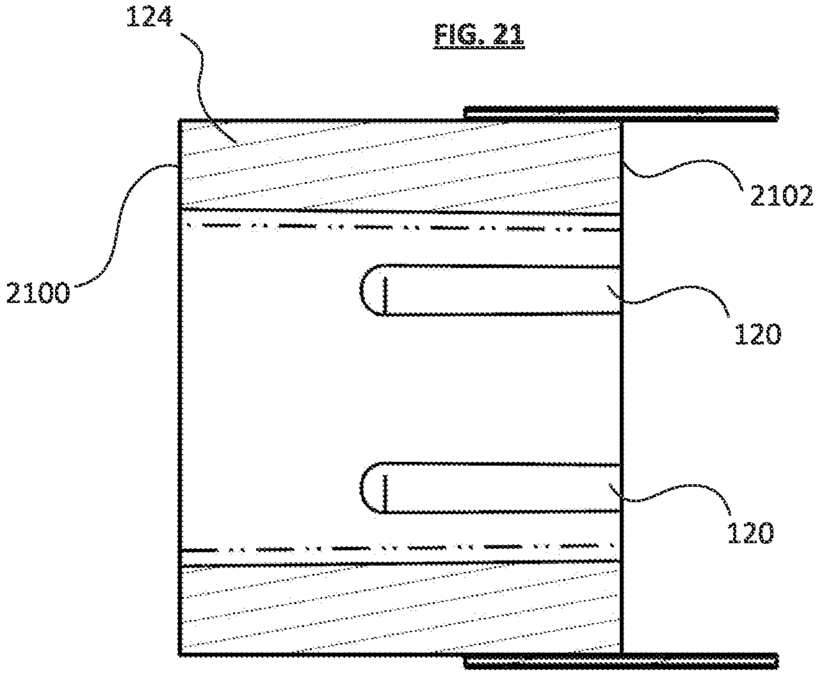
FIGS. 21 and 22 are cross-sectional view of the self-supporting coil of FIG. 18 when cut and viewed along the line F-F, according to some embodiments.
Figure 22:
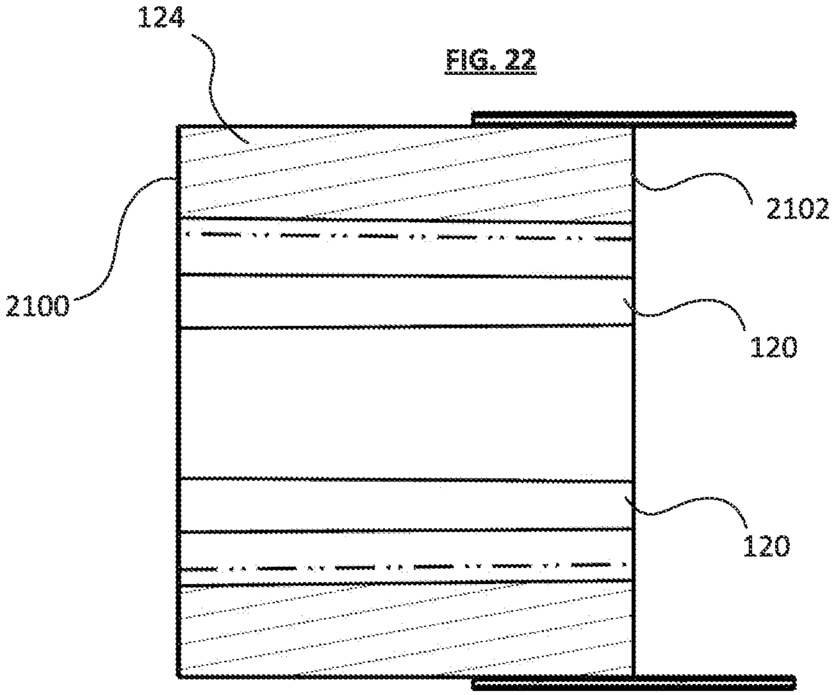

FIGS. 21 and 22, both of which are cutaway views of the coil 124 which is cut longitudinally across the coil along a line F-F and viewed in the direction of the arrow, illustrate examples of different lengths possible for the stationary protrusions 120 formed or positioned on the coil. In FIG. 21, the stationary protrusions extend from a second end 2102 of the coil toward a first end 2100 of the coil but terminate partially between these two ends. The termination may be approximately halfway between the first and second ends of the coil, or the termination may be closer to one end than the other. In FIG. 22, the stationary protrusions extend the entire longitudinal length of the coil from the first end 2100 to the second end 2102 such that the cross-section of the coil tunnel 110 is maintained as a "candy wrapper" shape throughout the longitudinal length of the coil. The coil may have taper or Draft features of a shallow angle (such as an acute angle of less than 30°, less than 15°, less than 10°, less than 5°, or any other suitable value therebetween) to aid with the manufacturing process of the coil assembly.

In some embodiments, as shown in FIGS. 6-8, 19, and 20, the movable portion 116 of the armature further includes depressions 800 at the location of the movable protrusions 122 on the side opposite from where the movable protrusions extend. For example, if a movable protrusion extends from the first surface 158 of the movable portion, a corresponding depression is formed on the second surface 160 of the movable portion opposite from where the movable protrusion is formed.

Figure 23:
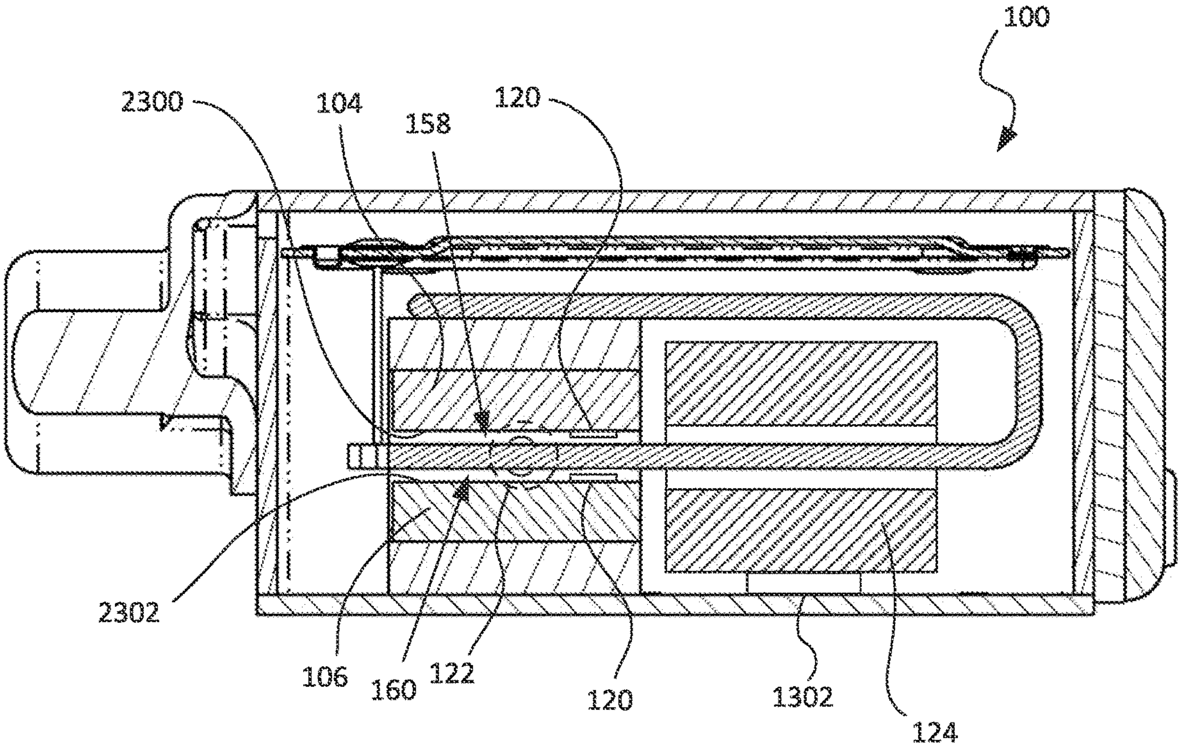
FIG. 23 is a side sectional view of a balanced armature receiver according to some embodiments.

FIG. 23 illustrates an example in which the stationary protrusions 120 are formed or positioned on surfaces of the magnets which face the movable portion 116 of the armature. One or more of the stationary protrusions are formed or positioned on a first surface 2300 of the first magnet 104, and one or more of the stationary protrusions are formed or positioned on a second surface 2302 of the second magnet 106. The stationary protrusions may be formed by attaching or disposing any suitable material, such as a polymeric material including but not limited to epoxy, on the surfaces of the magnets such that the resulting stationary protrusions extend from the surfaces toward the movable portion of the armature. The location of the stationary protrusions formed or positioned on the magnets are either longitudinally or laterally offset from the movable protrusions 122 formed or positioned on the surfaces 158 and 160 of the movable portion of the armature, where the movable protrusions extend from the surfaces of the movable portion toward the magnets.

The stationary and movable protrusions 120, 122 facilitate shock absorption or shock protection in response to an external shock or force applied to the receiver 100, for example during manufacture or operation of the receiver. The protrusions may protect the components of the receiver, such as armature 112, link 148, or diaphragm 138, from damages caused by a sudden or extreme deflection of the movable portion 116 of the armature caused by such external force by using the protrusions to reduce the degree of deflection of the movable portion.

In some examples, the protrusions may limit the amount of strain that a reed or armature undergoes by limiting the movement of the reed or armature. The limited movement, therefore, reduces the deflection of the reed or armature, which reduces the amount of strain experienced in the reed. The reduced displacement and strain also reduce the bending stress in the reed and decrease the likelihood or capacity of the reed to plastically deform in response to excitation experienced from an external acceleration. The protrusion may be solid, flexible, or both (that is, partially solid and partially flexible, for example). In some examples, the reduced motion of the reed or armature may reduce the proximity that the movable portion of the reed or armature may approach the magnets. That is, by maintaining the movable portion at a predetermined distance from the magnets, the magnetization from the magnets may have less of an effect the movement of the movable portion. For example, in some instances, the attractive force of the magnet may either cause acceleration in the movable portion of the reed or armature at a point of impact, restrain the movable portion from deflecting away from the magnet, or both, which may allow for increased damage to the reed in response to excitation.

In some examples, the protrusions may be positioned as far away as possible from the line of symmetry of the armature (for example, at or near the side edges of the armature, between which the line of symmetry may be located) given the structural limitation of the armature. Positioning the protrusions further outward with respect to the line of symmetry may improve the effect as explained herein that is offered by the protrusions, for example in case of the receiver experiencing shock from the side of the receiver housing. In some examples where there are protrusions of different sizes, the relatively smaller protrusions may be positioned further apart from the line of symmetry than the relatively larger protrusions. The smaller protrusions may be controlled with greater accuracy or precision than the larger protrusions. In some examples, additional protrusions may be positioned along the armature for additional protection for the armature, such as from a greater variety of shock applied from different directions as well as the different amplitudes of shock that the armature may experience.

In some examples, the protrusions are also beneficial as positioning markers during assembly or manufacture, such that the positions of the other components of the receiver (e.g., magnets, coil, bobbin, etc.) may be determined or confirmed with respect to the protrusions that are located on the armature. Alternatively, or additionally, the protrusions may be used as visual alignment feature (which may be detected using high-precision sensors or detectors) to facilitate centering of the other components during assembly or manufacture.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

What is claimed is:

1. A balanced armature receiver comprising:

a yoke retaining first and second permanent magnets in spaced-apart relation;

a coil assembly having a coil tunnel; and an armature having a portion coupled to the yoke, a movable portion that extends through the coil tunnel, and an end portion located at least partially between the magnets, wherein the end portion is free to deflect between the magnets in response to an excitation signal applied to the coil assembly, a stationary protrusion extending from a stationary portion of the receiver toward the movable portion of the armature; and a movable protrusion extending from the movable portion of the armature toward the stationary portion of the receiver, wherein the stationary and movable protrusions are offset laterally.

2. The balanced armature receiver of claim 1, wherein the stationary and movable protrusions are offset longitudinally.

3. The balanced armature receiver of claim 2, wherein the stationary portion of the receiver is the coil assembly.

4. The balanced armature receiver of claim 3, the coil assembly having a first end and a second end adjacent to the magnets, the second end of the coil assembly opposite the first end of the coil assembly, the stationary protrusion extending into the coil tunnel proximate the first end of the coil assembly.

5. The balanced armature receiver of claim 3, wherein the coil assembly comprises a coil, an insulator disposed on the coil, and an epoxy on a surface of the coil, wherein the epoxy forms the stationary protrusion.

6. The balanced armature receiver of claim 3, wherein the coil assembly comprises a coil and a bobbin, wherein the bobbin comprises:

a coil support member having the coil tunnel extending between a first end and a second end of the coil support member;

a first flange extending from the coil support member; and a second flange extending from the coil support member and spaced apart from the first flange, wherein the coil is disposed about the coil support member between the first and second flanges, and the stationary protrusion extends from the bobbin.

7. The balanced armature receiver of claim 6, wherein the stationary protrusion is proximate the first flange and the second flange is nearer the magnets than the first flange.

8. The balanced armature receiver of claim 3, wherein the coil assembly comprises a coil and a movement-restricting spacer disposed on one end of the coil, wherein the spacer forms the stationary protrusion.

9. The balanced armature receiver of claim 3, the magnets comprising a first end and a second end adjacent to the coil assembly, the second end of the magnets opposite the first end of the magnets, the stationary protrusion extending from a surface of the magnets proximate the second end of the magnets.

10. The balanced armature receiver of claim 3, further comprising a plurality of stationary protrusions extending from the coil assembly and into the coil tunnel toward the movable portion.

11. The balanced armature receiver of claim 10, wherein the plurality of stationary protrusions are offset laterally from each other.

12. The balanced armature receiver of claim 1, further comprising a plurality of movable protrusions extending from the movable portion toward the stationary portion of the receiver.

13. The balanced armature receiver of claim 12, wherein the plurality of movable protrusions are offset laterally or longitudinally from each other.

14. The balanced armature receiver of claim 12, wherein the plurality of movable protrusions include a first movable protrusion proximate the coil assembly and a second movable protrusion proximate one of the magnets.

15. The balanced armature receiver of claim 10, further comprising first and second movable protrusions positioned on opposing sides of the movable portion of the armature, the first and second movable protrusions located between the plurality of stationary protrusions.

16. The balanced armature receiver of claim 15, wherein the plurality of stationary protrusions include first and second pairs of stationary protrusions positioned adjacent opposing sides of the movable portion of the armature.

* * * * *